J. PILMAN.
WAGON BRAKE.
APPLICATION FILED MAY 7, 1910.
1,001,163.
Patented Aug. 22, 1911.
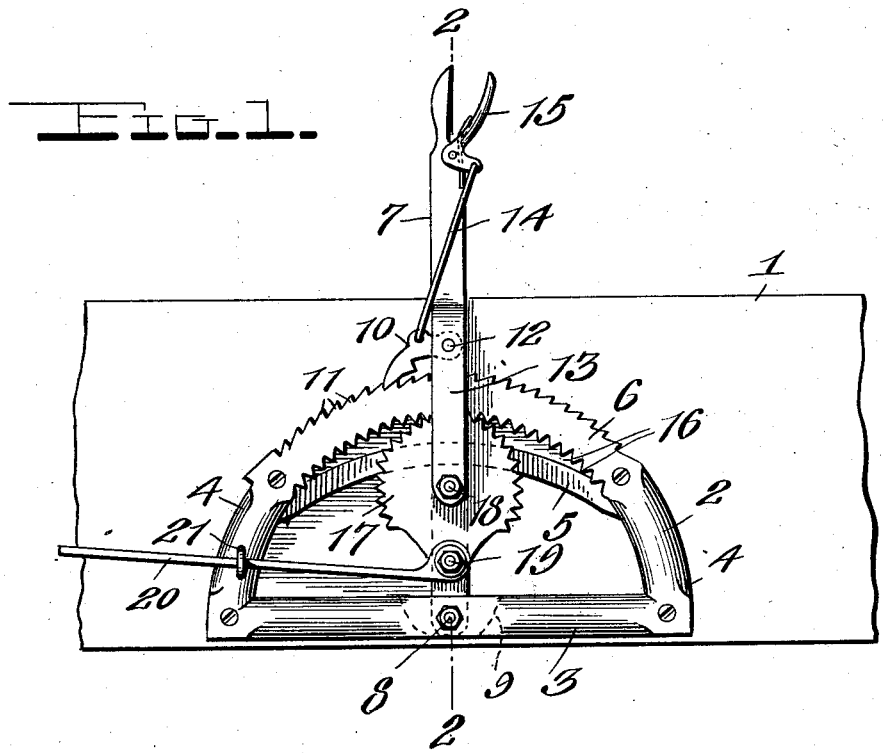
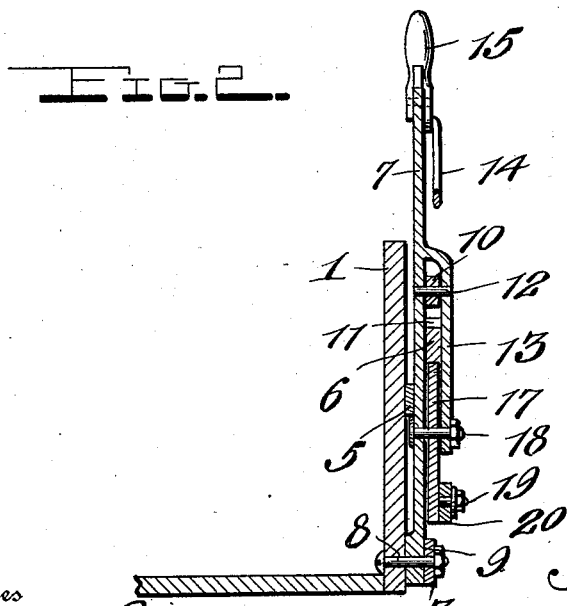
Witnesses
Chas. L. Griesbauer.
E. M. Ricketts.
Inventor
J. Pilman,
By Watson E. Coleman.
Attorney

UNITED STATES PATENT OFFICE.

JOHN PILMAN, OF LOUISVILLE, ILLINOIS.

WAGON-BRAKE.

1,001,163. Specification of Letters Patent. Patented Aug. 22, 1911.

Application filed May 7, 1910. Serial No. 560,063.

*To all whom it may concern:*

Be it known that I, JOHN PILMAN, a citizen of the United States, residing at Louisville, in the county of Clay and State of Illinois, have invented certain new and useful Improvements in Wagon-Brakes, of which the following is a specification, reference being had to the accompanying drawings.

This invention relates to improvements in actuating mechanisms for vehicle brakes.

The object of my invention is to provide an improved brake lever and ratchet connection, whereby the brake mechanism may be quickly and effectively applied by a comparatively slight movement of the hand lever.

With the above and other objects in view, the invention consists of the novel construction, combination and arrangement of parts, hereinafter fully described and claimed, and illustrated in the accompanying drawings in which:—

Figure 1 is a side elevation of my improved brake mechanism. Fig. 2 is a vertical sectional view.

Referring more particularly to the drawings 1 denotes the side of a wagon body or other support on which my improved brake actuating mechanism is mounted. This actuating mechanism may be used for operating any kind of brake mechanism (not shown) and comprises an open segmental-shaped attaching member 2 consisting of a lower horizontal bar 3, two upwardly and inwardly converging end bars 4, and two spaced upper bars 5, 6, uniting the end bars or portions 4. The upper bars 5, 6, serve as guides for a hand lever 7 which works between them, and the outermost bar 6 is curved longitudinally or arc-shaped and is substantially concentric with the fulcrum for the lever 7. The lower end of said lever is mounted on a pivot bolt 8 arranged in the center of the lower bar 3, which latter has on its inner face a recess 9 for the reception of the lever. The intermediate portion of the lever carries a pawl or dog 10 to co-act with ratchet teeth 11 formed on the upper edge of the bar 6, whereby the lever will be held in adjusted position. The pawl 10 has one of its ends pivoted at 12 beneath a reinforcing bar or plate 13 secured to and spaced from the lever 7, and the intermediate portion of said pawl is connected by a link 14 to a bell crank hand piece 15 pivoted on the upper handle end of the lever. The lower edge of the bar 6 is formed with rack teeth 16, with which meshes a segmental gear 17 mounted on a pivot 18 which has its ends supported in the lower portion of the lever 7 and the plate or bar 13 which is carried by said lever. The segmental gear 17 is formed at its side which is not provided with teeth, with a radially projecting arm carrying a wrist pin or crank pin 19 for the attachment of a brake-actuating rod or link 20. The latter slides loosely through a guide eye 21 on one of the bars 4 and may be connected in any manner to any suitable brake mechanism.

In operation it will be seen that when it is desired to apply the brake the handle end of the lever 7 is grasped and the hand piece 15 is actuated to retract the pawl 10 from the ratchet teeth 11, and said lever is then swung on its pivot 8 to cause the gear segment 17 to travel over the rack 16, and thereby shift the crank or wrist pin 19 so that the brake-actuating rod will be drawn in the direction to apply the brake. Owing to the mounting of the gear 17 on the lever, its engagement with the stationary rack 16 and the connection of the rod 20 with the crank or wrist pin on said gear, a comparatively slight movement of the brake lever 7 will cause the wrist pin to move through a suitable distance, thereby permitting the brake mechanism to be quickly and effectively applied.

Having thus described the invention, what is claimed is:

1. The herein described brake actuating mechanism comprising a segment having an arched upper bar provided on its upper side with ratchet teeth and on its lower side with gear teeth, a cross bar connecting the ends of the arched upper bar and forming the base of the segment, an inner curved guide bar spaced above the cross bar, disposed on the inner side of the curved upper bar and having its ends secured thereto, the guide bar being to one side of the vertical plane of the upper bar and co-acting with the inner side of the cross bar to bear against one side of a wagon box, a lever operating between the upper bar and the guide bar, having its lower end pivoted to the cross bar by a bolt which also extends through the wall of the wagon box, the said lever being provided on its outer side with a reinforcing bar which extends downwardly and bears on the outer side of the upper bar, a segment gear between the lever and its reinforcing bar and having a pivot engaging the lever and the reinforcing bar, said segment gear engaging the gear teeth on the under side of the upper bar and said reinforcing bar terminating near the pivot of the segment gear to expose the lower portion of said gear, a rod pivotally connected eccentrically to the segment gear and a locking pawl pivotally mounted between the lever and its reinforcing bar for engagement with the ratchet teeth of the upper bar.

2. The herein described brake actuating mechanism comprising a segment having an arched upper bar provided on its under side with gear teeth, a cross bar connecting the ends of the arched upper bar, a lever having its lower end pivotally connected to the cross bar, a segment gear carried by and pivotally connected to the lever and engaging the gear teeth of the arched upper bar, a rod pivotally connected eccentrically to the segment gear and a guide on one side of its arched upper bar and through which the said rod extends.

In testimony whereof I hereunto affix my signature in the presence of two witnesses.

JOHN PILMAN.

Witnesses:
ODELL ✕ TOLBERT,
      his   mark
CHARLES DOBBS.

---

Copies of this patent may be obtained for five cents each, by addressing the "Commissioner of Patents, Washington, D. C."